United States Patent [19]

Joschko et al.

[11] 3,877,705

[45] Apr. 15, 1975

[54] DIAMOND SCANNING ELEMENT

[75] Inventors: Gunter Joschko; Karl-Ekkehard Schriefl; Hans-Jurgen Winter, all of Berlin, Germany

[73] Assignee: Ted Bildplatten Aktiengesellschaft, AEG-Telefunken, Teldec Zug, Switzerland

[22] Filed: Nov. 14, 1972

[21] Appl. No.: 306,208

[30] Foreign Application Priority Data

Nov. 19, 1971 Germany ........................... 2158216

[52] U.S. Cl. .......................... 274/38; 179/100.41 P

[51] Int. Cl. .......................... G11b 3/44; G11b 9/00

[58] Field of Search ......... 274/38; 33/18 R; 128/39; 179/100.41 PE; 178/6.6 A

[56] References Cited

UNITED STATES PATENTS

| | | | |
|---|---|---|---|
| 3,138,875 | 6/1964 | Christensen | 33/18 R |
| 3,781,020 | 12/1973 | Batsch et al. | 274/38 |

FOREIGN PATENTS OR APPLICATIONS

| | | | |
|---|---|---|---|
| 234,353 | 5/1960 | Australia | 125/39 |

OTHER PUBLICATIONS

Industrial Diamond Review, Vol. 20, 2/60, PP. 31–37, Pahlitzsch.

*Primary Examiner*—Richard E. Aegerter
*Assistant Examiner*—Steven L. Stephan
*Attorney, Agent, or Firm*—Spencer & Kaye

[57] ABSTRACT

In a signal scanner for the scanning of signals stored on an information carrier which is moving with a velocity relative to the signal scanner, an element including a diamond adapted at least for guiding the signal scanner by following a groove, which diamond has at least one part of its bounding surfaces selected from the natural crystal surfaces of diamond, on which part the crystallographic orientation of the diamond is recognizable.

44 Claims, 9 Drawing Figures

DIAMOND SCANNING ELEMENT

BACKGROUND OF THE INVENTION

The present invention relates to a scanning element of a signal scanner. The scanning element is made of diamond and serves either for groove-guiding the signal scanner and simultaneously for signal sensing, or else only for guiding the scanner by following a groove, during the scanning of signals stored on an information carrier. During scanning, the scanning element has a velocity relative to the information carrier along a groove associated with the carrier.

It is known that it is possible to capture not only sound oscillations of an upper frequency limit of about 20 kilohertz in the form of undulations on the surface of a recording groove on a phonograph-record-like information carrier, but also signal oscillations of a much higher frequency, for example a video signal, extending to the range of several megahertz. A technique of scanning referred to as "pressure scanning" is used to store and then mechanically read out these surface undulations of higher frequency. No longer is a mechanical-electrical transducer used, whose tracing portion must indergo deflections corresponding to the undulations being traced. Rather, a so-called pressure scanner is used, which engages, with the help of an ice-skate-blade shaped tracing portion, in the signal groove. The tracing portion covers simultaneously a plurality of wavelengths of the stored signal oscillations and is in simultaneous contact with a corresponding plurality of peaks of the signal-representing undulations. The tracing portion has a sharp trailing edge and, as each peak of the relief formed by the undulations passes by this edge and leaves the tracing portion contact region, there is an abrupt pressure release on the scanning element. This abrupt change of pressure is registered by a mechanical-electrical transducer and changed into an electrical output signal.

It should be noted, however, that the simultaneous contact of the tracing portion of a scanning element with a plurality of peaks of a relief is not an absolutely necessary condition for pressure scanning. Rather, pressure scanning can also be done using a tracing portion whose length is short compared to the wavelength of the relief being scanned.

In pressure scanning, the surface relief of the information carrier represents the stored signal. Due to the bearing pressure of the scanning element, this relief undergoes an elastic compressive deflection as the tracing portion of the scanning element moves over it during scanning. This deflection is greater in size than whatever deflection might be caused for the scanning element. The inertia of the scanning element causes it to remain almost motionless in the surface in whiich the deflection of the information carrier surface relief occurs.

Besides the sensing of a high frequency signal, for example a video signal, using pressure variations on a diamond scanning element, it is also possible to carry out, for instance, an optical scanning of undulations in a groove on an information carrier. But even here, a means is needed for gliding in the groove to guide the optically sensing organ, for example a light-passing slit or a lens. The present invention can thus be used either for groove-guidance plus scanning, such as is the case in the pressure scanning of a video signal stored as surface undulations in a groove on a phonograph-record-like information carrier, or it can be used just for groove-guidance, where the scanning of the surface undulations is done optically.

In the storing and playback of signal oscillations in the megahertz range, the information carrier, for instance a disc resembling a phonograph record, must run with a high rotational speed. In the case of video signals, a rotational velocity of 25 rotations per second is needed. It has been found that the information carrier can undergo a large number of repetitions of the playback process without suffering in quality, while, to the contrary, the tracing portion of the scanning element, although made of a wear-resistant material, namely diamond, begins to show wear after a period of use and must be replaced.

According to a previous proposal, it has been already possible to increase the life of the tracing portion of a diamond scanning element considerably. This previous proposal is set forth in pending U.S. patent application Ser. No. 202,988, filed Nov. 29, 1971, now U.S. Pat. No. 3,781,020, by Helmut Batsch et al. for a "Diamond Stylus for Disc Records." The disclosure of that application is incorporated here by reference for the purpose of providing basic exemplary information which may be applied for putting the diamond scanning element of the present invention to use. According to the teachings of this application of Helmut Batsch et al., it is proposed that the diamond be crystallographically so oriented that the frictional forces causing the wear be directed in one of the wear-resistant directions of the diamond crystal. Such directions of high wear resistance and greater hardness lie, for example, along the diagonals of natural cubic faces of the diamond crystal. These faces should have been formed as much as possible without disturbances. The same directions (of the diagonals) appear also in natural dodecahedral faces.

Additionally according to the proposal of the application of Helmut Batsch et al., the edge of the tracing portion running in contact with the information carrier can be at about 3° to 10° from the direction of greatest wear resistance.

Relative to the system of indices as used in the application of Helmut Batsch et al., and herein for the designation of crystallographic directions and planes, reference is made to the book KRISTALLOGRAPHIE, by Prof. Dr. W. Bruhns, Sammlung Göschen Publisher, 1923, particularly page 21. Reference is also made to: the book, ANORGANISCHE CHEMIE (INORGANIC CHEMISTRY), by Walter Hückel, Verlag Akademische Verlagsgesellschaft Publisher, Leipzig Cl, 1960, pages 164 and 165; ELEMENTS OF OF X-RAY DIFFRACTION, by B.D. Cullity, published by Addison-Wesley, Reading, Massachusetts, 1956, pages 37 to 39 and 48 to 49; and AN INTRODUCTION TO CRYSTAL CHEMISTRY, by R. C. Evans, published by Cambridge University Press, Cambridge, 1952, pages 28 and 29.

The machining of the tracing portion of a diamond scanning element according to the teachings of the application of Helmut Batsch et al. has led to the advantage that exactly those crystallographic surfaces and directions of a diamond crystal are used for tracing which can best withstand undesired wear.

The tracing portion of a diamond scanning element is here understood to mean the scanning element surface part which faces toward the information carrier. It partly fits down into a groove of an information carrier and is pointed like a wedge, ball, pyramid, or the like, so that this fit may be obtained. The forming of a cutting edge or actual point is, however, prevented by a chamfer, bevel, or rounding off.

The machining of the tracing portion of a scanning element out of a crystal, as proposed in the application of Helmut Batsch et al. is, however, a time consuming pursuit. Often, considerable material must be removed. It has, therefore, been proposed, in U.S. patent application Ser. No. 293,514, filed Sept. 29, 1972, by Günter Joschko et al. for a "Scanning Element," which application is based on West German patent application No. P 21 49 439.3 l of Sept. 30, 1971, that, instead of machining a tracing portion out of a crystal, a tracing blade or point be in the form of an already present natural part of a well developed cubic and/or cubooctahedral synthetic diamond. A corner formed at the intersection of three natural surfaces of a diamond crystal is to be used, according to this earlier proposal, as a scanning corner. Thus, the natural form of a diamond crystal is to be exploited as a tracing portion. A natural edge can serve as a tracing blade extending out in front of the tracing corner. The edge serving for tracing according this earlier proposal may also possess a natural chamfer, for instance a chamfer lying in a dodecahedral plane.

The disclosure of the above-mentioned application of Gunter Joschko et al., is incorporated here by reference for the purpose of providing additional basic exemplary information which may be applied for putting the diamond scanning element of the present invention to use.

SUMMARY OF THE INVENTION

An object of the invention is to provide a diamond scanning element that is capable of being arranged for wear resistance in a scanning device more easily and with greater accuracy than has been the case for the previous diamond scanning elements of increased wear resistance.

This as well as other objects which will become apparent in the discussion that follows are achieved, according to the present invention, by providing, in a signal scanning means for the scanning of signals stored on an information carrier which is moving with a velocity relative to the signal scanning means, an element including a diamond adapted at least for guiding the signal scanning means by following a groove, which diamong has at least one part of its bounding surfaces selected from the natural crystal surfaces of diamond, on which part the crystallographic orientation of the diamond is recognizable.

GENERAL ASPECTS OF THE INVENTION

Thus, according to the present invention, a scanning element is provided whose crystallographic orientation is recognizable, in order that it can be easily arranged during assembly in a scanner such that the wear-resistant crystal directions can coincide with the directions of loading.

A further development of the invention is to simplify the manufacture of a scanning element further by providing a saving on the machining previously needed.

Finally, a scanning element of diamond is to be provided which is especially resistant to the wear resulting when a scanning element glides along a groove on an information carrier. Thus, considering a section of a scanning element lying on a cutting plane extending transversely to the direction of the relative velocity between the scanning element and the information carrier, which section has an approximately trapezoidal form, a wear of the scanning element takes place on the surfaces extending parallel to the direction of the relative velocity on either side of the lowest tracing portion. In the case of a wedge-shaped tracing portion, a wear likewise takes place on the two side surfaces meeting at the (rounded off) wedge edge.

The wear resistance of at least one of these side surfaces on a tracing portion is to be increased by the invention. In the present invention there is the possibility of combining the advantages of the two of the earlier proposals mentioned above; i.e. the present invention makes it possible to obtain an increased wear resistance and simultaneously lessen production costs by decreasing the time required for manufacturing.

To accomplish these goals, the present invention provides that at least one part of the bounding surfaces of the diamond scanning element of the invention is made up by a natural diamond-crystal surface that allows recognition of the crystallographic orientation of the diamond scanning element.

One might think that the crystallographic orientation would be recognizable in the invention of the above-mentioned earlier application of Joschko et al., since it uses natural crystal edges or corners, but it has actually been found practice that these edges and corners get rounded off in the finish grinding, so that the orientation can no longer be recognized with exactness. If natural faces are present, as in the present invention, then an exact recognition of the crystallographic orientation of the diamond scanning element is always possible.

Advantageously, the scanning element tracing surface facing the information carrier during scanning is bounded by at least one crystallographic octahedral surface. When this lies substantially parallel to the direction of the relative velocity between the information carrier and the scanning element, it is assured that the tracing surface is lying in the groove on the information carrier such that a wear-resistant crystal direction of a crystallographic cubic or dodecahedral plane is substantially coinciding with the direction of the frictional force between the scanning element and the information carrier. If the crystallgraphic octahedral surface is at the same time a natural crystal surface, no grinding of the diamond is required.

The word "natural" is used herein to designate crystal faces, edges, and corners which result when a diamond crystal grows freely and which are determined by the interaction of the carbon atoms with one another when coalescing to form diamond. It is thus intended that "natural" may be used to describe faces, edges, and corners of synthetic diamonds as well as those found in the ground.

Preferably, when a tracing portion in the form of a blade is being used, the tracing surface is inclined upwardly from the direction of the relative velocity of the scanning element with respect to the information carrier. The angle used is preferably less than 20°. This inclining eases the gliding of the scanning element over the peaks and valleys of the signal-bearing surface relief onthe information carrier.

The diamond can be oriented also such that a crystallographic cubic or dodecahedral surface is inclined at an angle less than 20° above the direction of the relative velocity of the scanning element with respect to the information carrier. The cubic or dodecahedral surface is preferably parallel to a direction within the angular region extending from the tracing surface to the direction of the relative velocity of the scanning element with respect to the information carrier.

The angle between the cubic or dodecahedral surface and the direction of the relative velocity is preferably smaller than 15°.

The approximately trapezoidal cross section mentioned above is obtained simply in a preferred form of the invention by providing an orientation in which the tracing surface lies between two crystallographic, and, in particular, natural, octahedral surfaces extending essentially parallel to the relative velocity. The tracing surface can extend essentially parallel to a crystallographic cubic or dodecahedral surface.

If the tracing surface lies between two crystallographic octahedral surfaces and additionally is essentially parallel to a crystallographic cubic or dodecahedral surface, and particularly when it is essentially parallel to a cubic surface, then a scanning element of approximately trapezoidal cross section is obtained exhibiting almost optimum resistance to wear. When the scanning is of the type where a plurality of peaks of the signal-bearing relief is being contacted simultaneously, such a scanning element is moved relatively in an information carrier groove, which contains a stored relief, with a slight inclination with respect to the scanning plane. The scanning plane is defined in that it contains the vector of the relative velocity between the scanning element and the information carrier and in that it is perpendicular to the force vector representing the bearing force of the scanning element on the information carrier.

That the just-described form of the invention has such a high resistance to wear comes from, among other things, the fact that the side surfaces of the scanning element, being formed by crystallographic octahedral planes are especially resistant to wear in certain directions lying in the octahedral planes. The presence of such directions in the octahedral planes has been disclosed in the above-mentioned application of Helmut Batsch et al. The wear-resistance of these octahedral planes in certain crystallographic directions is made especially good use of, when the angle of inclination of the tracing surface of the scanning element from the direction of the velocity of the scanning element relative to the information carrier is relatively large and the tracing surface lies parallel to a crystallographic cubic plane.

The tracing surface of the approximately trapezoidally shaped cross section scanning element is, moreover, to extend essentially symmetrically about a symmetry plane defined by the direction of the relative velocity and the direction of the force with which the scanning element bears, during scanning, on the surface of the information carrier.

According to a further development of the invention, the wear resistance of the tracing surface can be still further improved by inclining the tracing surface by a small angle from the direction of the velocity of the scanning element relative to the information carrier and at the same time making a crystallographic cubic or dodecahedral surface essentially parallel to the direction of the relative velocity. This improvement is achieved due to the fact that the tracing surface is loaded most where the peaks of the signal-bearing relief lose contact with the scanning element after having glided along in cointact with the tracing surface. This location of greatest loading is termed the trailing edge and trails the remainder of the tracing surface of the scanning element as it moves relatively to the information carrier. This location is trailing portion 9 lying at the intersection of face 6 and tracing surface 8 in FIGS. 1 and 2 of the abovementioned application of Helmut Batsch et al. Because of the strong loading, this location on the tracing surface tends to wear, i.e. it becomes rounded off. This tendency toward becoming rounded off is smallest — in the case where a crystallographic cubic or dodecahedral plane is situated within the angular region lying between the tracing surface and the direction of the velocity of the scanning element with respect to the information carrier — when the crystallographic cubic or dodecahedral plane extends essentially parallel to the direction of the relative velocity. The direction of the tracing surface can here nevertheless be inclined from the direction of the relative velocity of the scanning element with respect to the information carrier. Such inclination is especially of advantage when the scanning element spans a plurality of the peaks of the signal-bearing relief during scanning. The tracing surface can here be angled-off or curved near to its trailing edge such that the portion of the tracing surface right by the trailing edge is parallel to the direction of the relative velocity. This parallel attitude should exist over a length in the order of magnitude of the length of one of the shortest peaks of the surface relief, where here the length of the peak is measured in the direction of the relative velocity between the scanning element and the information carrier. This means that the length of the tracing surface portion having the parallel attitude is roughly equal to one-half of the shortest wavelength of the signal. If the tracing surface is roughly equal to the length of a shortest peak anyway, then there is no need to incline the tracing surface from the direction of relative velocity.

The tracing surface can be approximately symmetrical about a symmetry plane lying perpendicularly to the edge between the tracing surface and the crystallographic octahedral face bordering the tracing surface, which edge extends essentially parallel to the direction of the relative velocity. If this approximate symmetry holds also with respect to the angles formed at either end of the tracing surface between the tracing surface and the surfaces terminating the tracing surface, then there is the special advantage that the scanning element can be used in either of the two, opposing, possible directions for the relative velocity of the scanning element with respect to the information carrier. As a result, after the original trailing edge of such a symmetrical scanning element has been rounded off by wear, it can just be turned around in order to obtain an unworn trailing edge. The life of a scanning element can be practically doubled by using this technique.

Grinding costs are reduced when the tracing surface contains parts of a natural cubic or dodecahedral surface of a diamond crystal, be it synthetic or one taken from the ground.

Especially advantageous is the terminating of the tracing surface of a scanning element using a natural crystal surface. This enables the obtaining of an especially well formed, trailing edge on the tracing surface. The edge lies very exactly in one plane, namely the plane of the natural crystal face doing the terminating. The accuracy of the trailing edge obtained in this way is of special importance for optimizing the scanning process for scanning elements which contact a plurality of peaks of a signal-bearing relief.

In any event, there are a number of very important advantages obtained by using natural crystal surfaces. For example, the angles between natural, crystallographic surfaces are constants of nature. These angles are consequently maintained in the present invention with the greatest possible accuracy, without there being any effort required toward this end. In contrast, where a tracing blade is machined out of a diamond crystal, angle deviations in a tolerance range of 5° cannot be practically prevented. Moreover, the grinding process needed for working a tracing portion out of a raw crystal inherently means that disturbances in the crystal lattice structures arise on the worked surfaces. Such machined surfaces are thus already damaged in their structure, even before they have been put to the scanning use for which they are intended. In contrast, the naturally grown surfaces of a diamond crystal, either a synthetic crystal or one from the ground, exhibit undamaged lattice structures. Also the correct orientation of the ready scanning element of the present invention can be carried out more easily and accurately than for scanning blades which have been machined out of a crystal. Using the natural surfaces of the crystal, the crystallographic position of the element of the invention can be immediately determined with certitude. When machining from a crystal it is usual to begin with a blank that has been split off of a larger diamond. Already, before the beginning of the machining, a correct orientation of the blank cannot be carried out with certainty, because the cleavage faces are not always parallel to crystallographic planes of a crystal. Thus, the machining process can be burdened with an error right from the beginning, and this can add to the unavoidable error arising in angular relationships during grinding. It will be appreciated, therefore, that one can never be certain in the working of a scanning blade from a crystal whether the bounding surfaces of a scanning blade are really accurately parallel to a crystallographic surface or not. In using scanning elements with natural crystal faces, these uncertainty factors are eliminated.

Such a scanning element can be at least a part of a diamond octahedron or a diamond pyramid. The triangular faces are crystallographic octahedral faces. The base surface of the pyramid and the base surface common to the two pyramids of the octahedron form crystallographic cubic surfaces. The vertices are flattened off or rounded such that the tracing surface contains crystallographic cubic surface portions. Diamond octahedrons or pyramids occur in diamonds taken from the ground, while at least octahedrons may be produced synthetically. In case there is no natural flattening off of the vertices, this can be done using grinding as for rounding. A ground flattening or rounding can be inclined at a small angle of, for example, 10° to 15° from the direction of the relative velocity of the scanning element with respect to the information carrier. Near to the trailing edge, however, the tracing surface lies in a crystallographic cubic surface.

The scanning element, which is formed of a part of a diamond octahedron or pyramid and whose tracing surface contains a crystallographic cubic plane at least in the immediate proximity of the trailing edge, represents what is presently considered the best form of the present invention, since such a scanning element appears to have the best resistance to wear and rounding off of the trailing edge.

The scanning element of the invention can, however, be formed of a part of a diamond octahedron, pyramid, cubo-octahedron, or cubo-octahedral pyramid frustum. The side faces contain crystallographic octahedral faces and the base surface a crystallographic cubic surface. At least one of the edges of the type occurring at the intersections of two octahedral side surfaces is flattened or rounded off in such a manner that the flattening or rounding forming the tracing surface contains a crystallographic dodecahedral surface.

In all forms of the invention, manufacture is eased still further when all side surfaces bordering the tracing surface are natural crystal faces. That is, the tracing surface is bordered by four natural crystal faces of diamond, and, in particular, by four crystallographic octahedral surfaces. Then, no working of the surfaces of the scanning element facing the surface of the information carrier is needed at all, except perhaps for some working of the tracing surface itself. Bordering by four octahedral faces relates to the case where the thus-bordered tracing surface extends approximately in the direction of a crystallographic cubic surface.

In the case where the tracing surface runs approximately in the direction of a crystallographic dodecahedral surface, bordering is by two octahedral surfaces and two cubic surfaces, instead of the four natural crystallographic octahedral surfaces.

DETAILED DESCRIPTION OF THE PREFERRED EMBODIMENTS

The invention will now be explained in more detail with the help of the drawings and the embodiments illustrated there. A tracing blade is described as an example.

Figure 1:
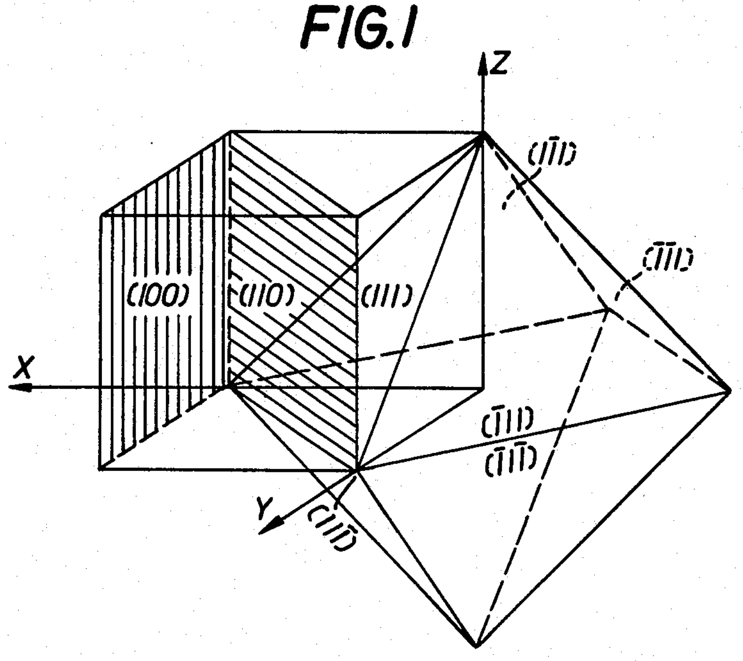
FIG. 1 is a perspective view of a cube combined with an octahedron.

FIG. 1 serves just to explain the crystallographic concepts utilized in the description. FIG. 1 is alone not an embodiment of the invention.

FIG. 1 shows a right-angled coordinate system X, Y, Z, where a cube and an octahedron have been drawn in. Note that the octoahedron is made up of two octahedral pyramids. These forms are the simplest in which the diamond, belonging to the regular system, can crystallize. Some of the crystal planes have been designated by their Miller indices. For example, the left cubic face bears the index (100), which says that this face cuts the X-axis at the unit distance 1, while the zeros following the 1 indicate that this face cuts the Y and Z axes in each case at infinity. The left-upper octahedral surface is designated (111), since it cuts the X, Y, and Z axes all at unit distance 1. Right of the (111) surface and also exposed to the viewer is the $(\bar{1}11)$ octahedral surface. Hidden (hidden lines are dashed) behind the (111) and $(\bar{1}11)$ planes are the octahedral surfaces $(1\bar{1}1)$ and $(\bar{1}\bar{1}1)$. Of the lower octahedral planes, which belong to the lower octadedral pyramid, the $(11\bar{1})$ and $(\bar{1}1\bar{1})$ planes have been designated in FIG. 1.

Finally in FIG. 1, the dodecahedral plane (110) has been shaded in. This plane runs diagonally through the cube. Dodecahedral planes are determined in that they are parallel to a cubic edge and at the same time parallel to an octahedral edge. Dodecahedral surfaces can, consequently, be thought of as chamfered octahedral edges.

Referring now to FIG. 2, we have again a cube 1 and an octahedron 3. The upper half of the octahedron has been purposefully brought to prominence as pyramid 2. The vertex of pyramid 2 is chamfered such that a crystallographic (001) cubic plane has been developed. Note that this plane developed by the chamfering has been shaded identically to the manner in which the (001) surface on the cube has been shaded, in order to indicate the crystallographic identity of the two surfaces.

According to the present invention, pyramid 2 can be used as a tracing blade. In such an embodiment, the surfaces (III), $(\bar{I}II)$, $(\bar{I}\bar{I}I)$, and $(I\bar{I}I)$, as well as the chamfer of the octahedral vertex developed as a (001) plane, are facing the information carrier. All of these just named surfaces of the scanning blade form the surface of the scanning blade facing the surface of the information carrier. This surface of the scanning blade contains one surface, namely the shaded (001) surface, which is bordered by four crystallographic octahedral planes. Two of these octahedral surfaces, namely the $(\bar{1}11)$ octahedral surface shown shaded in FIG. 2 and the oppositelylying, stippled, $(1\bar{1}1)$ octahedral surface, run essentially parallel to the direction of the relative velocity during the scanning of the information carrier. The direction of the relative velocity is indicated by the vector P in FIG. 2.

Figure 2:
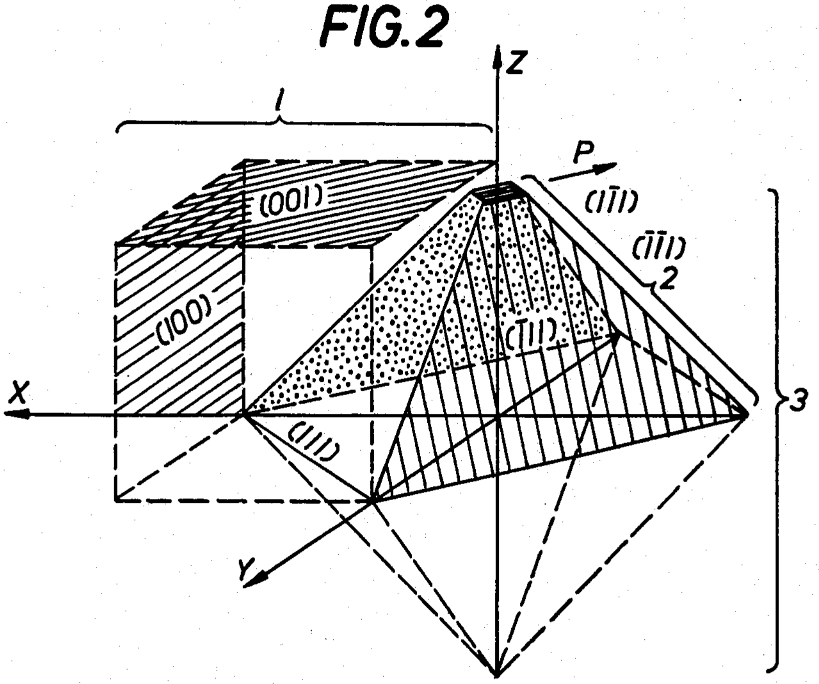
FIG. 2 is a perspective view showing the crystallographic orientation of the embodiments of FIGS. 3*a* to 3*d*.

The octahedral pyramid 2 illustrated in FIG. 2 has a square base. But, when using an octahedral pyramid as a scanning blade, it is not necessary that its base be square. The octahedral diamond crystals found in the ground or those synthetically produced frequently do not exhibit a square base.

Such an octahedral pyramid, or more accurately a frustum of an octahedral pyramid, is used and illustrated in FIGS. *3a* to *3d* as a scanning blade. The scanning blade of FIG. *3a*, where the visible surfaces are $(1\bar{1}1)$, $(\bar{1}\bar{1}1)$, and (001), is glued to a transducer 4. Vector 8 represents the force with which the scanning blade is brought to bear against the information carrier 5 (shown in FIGS. *3c* and *3d*).

FIG. *3b* is a cross section of the scanning blade and of the transducer 4 of FIG. *3a*. The cutting plane for the cross section of FIG. *3b* contains the bearing force vector 8 and is perpendicular to the direction of the relative velocity, which is the velocity which the scanning blade has with respect to the information carrier and which is indicated by vector P in FIG. *3a*. The angle between the octahedral surfaces $(1\bar{1}1)$ and $(\bar{1}11)$, which are the side faces of the scanning blade and border the tracing surface (001) and which extend approximately parallel to the direction of the relative velocity P, enclose an angle of approximately 70°. The direction $(\bar{1}10)$ appears in FIG. *3b* as the point at the intersection of the $(1\bar{1}1)$ and (001) planes. The cutting plane of the section of FIG. *3b* is perpendicular to the $(\bar{1}10)$ direction.

Referring now to FIG. *3d*, it is shown there that also the two other octahedral surfaces (111) and $(\bar{1}\bar{1}1)$ have between them an angle of 70°. FIG. *3d* is a cross section determined by a cutting plane characterized in that it contains the vector of the relative velocity P and the vector of the bearing force 8. The (001) surface is inclined from the direction P of the relative velocity. Of course, the relative velocity P is parallel to the scanning plane, i.e. it is parallel to the surface of the information carrier 5. Relative velocity P is caused here, as in all embodiments of the invention, preferably by using a motive means 12 to move the information carrier 5 relative to the scanning element. The angle of inclination of the (001) tracing surface is 10° in FIG. *3d*. This angle can lie in a range of 0 to 20° and preferably lies in the range 3° to 15°. In the embodiment of this FIG. *3d*, the crystallographic cubic plane (001) coincides with the tracing surface of the scanning blade. The crystallographic cubic direction thus lies within the angular range between the tracing surface and the direction of the relative velocity P. The (001) surface contacts the scanning plane at an edge referred to as the scanning edge or the trailing edge. The scanning edge is perpendicular to the direction of the relative velocity P. The scanning plane is an imaginary plane, which coincides with the macroscopic surface of the information carrier. Microscopically considered, the surface of the information carrier 5 is no plane; rather, it is a surface furrowed by a recording groove. The trailing edge is perpendicular to both the bearing force 8 and the relative velocity P.

Surface (001) is symmetric about symmetry plane 9, which is characterized in that it is perpendicular to the edge $(\bar{1}10)$ identified in FIG. *3b*. The symmetry is with respect to the angles between the (001) surface and the octahedral surfaces (111) and $(\bar{1}\bar{1}1)$ respectively.

While in FIG. *3d* not only the octahedral surfaces can be natural crystal faces, but also the tracing surface can contain parts of a natural, unmachined crystal (001) surface, this is not the case in FIG. *3c*. In the case of the embodiment of FIG. *3c*, the crystallographic cubic surface (001) coincides with the scanning plane, i.e. with the macroscopic surface of the information carrier 5, while the tracing surface of the scanning blade, also here bordered by octahedral surfaces, is inclined from the surface of the information carrier by an angle of 10°. This inclination may be obtained by appropriate grinding off of an octahedron vertex.

In the embodiment of FIG. *3c*, the octahedral surfaces bordering the inclined tracing surface to either side of the relative velocity vector P extend not just approximately, but exactly, parallel to P. However, here also, the crystallographic cubic surface ((001) still lies in an orientation withiin the angular range between the inclined tracing surface and the direction of the relative velocity P; thus, here, the orientation of the crystallographic cubic surface contains the direction of the relative velocity.

Figures 3A, 3B, 3C, 3D, 4A, 4B, 4C:
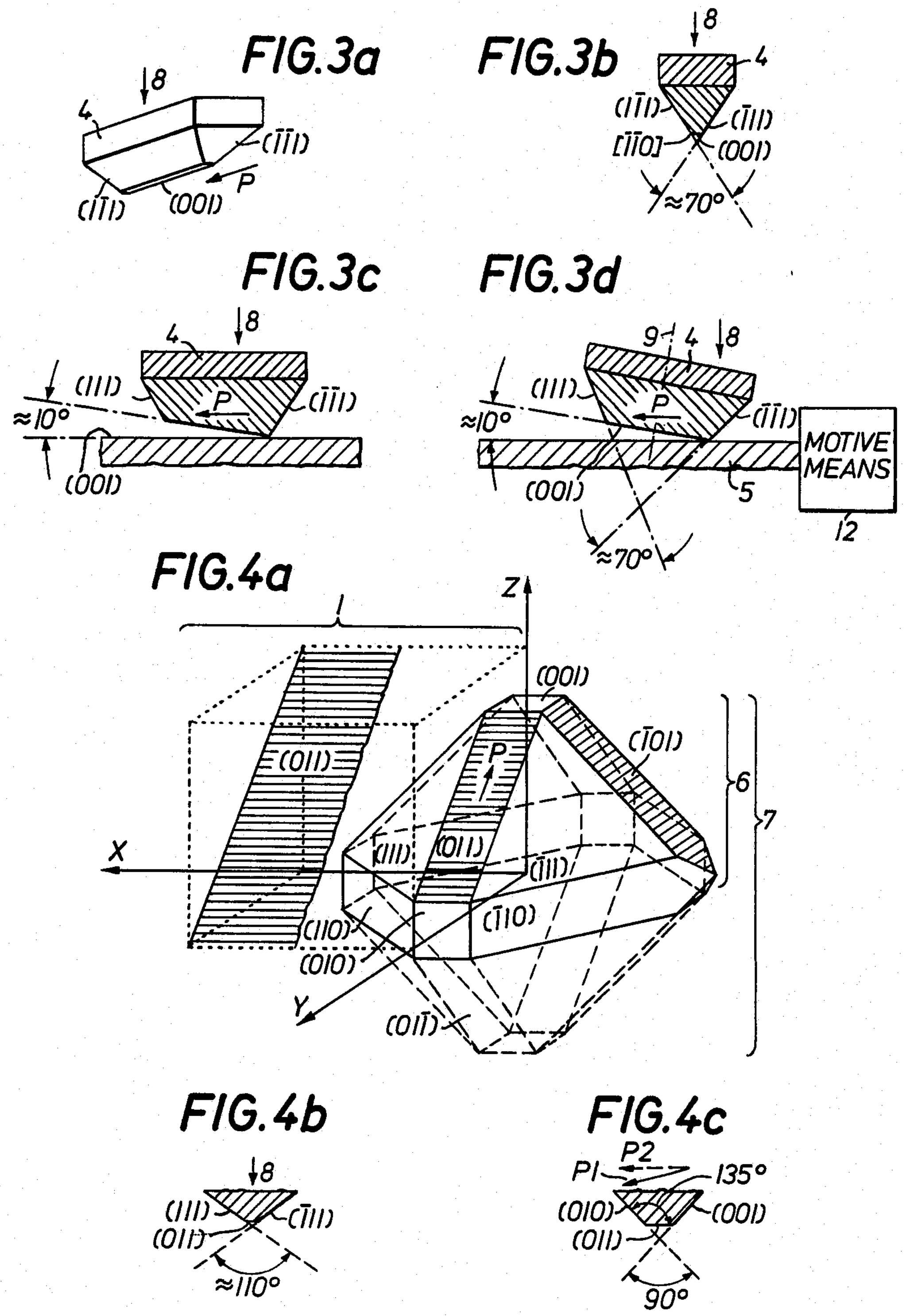
FIG. 3*a* is a perspective view of one embodiment of the invention.
FIG. 3*b* is a section on a cutting plane perpendicular to the long dimension of the embodiment in FIG. 3*a*.
FIGS. 3*c* and 3*d* are sections of alternatives of the embodiment of FIG. 3*a* on a cutting plane which is vertical in FIG. 3*a* and which contains the long dimension of the embodiment.
FIG. 4*a* is a perspective view showing the crystallographic orientation of the embodiments of FIGS. 4*b* and 4*c*.
FIG. 4*b* is a cross section of the diamond of FIG. 4*a* on a cutting plane perpendicular to the vector P appearing in FIG. 4*a*.
FIG. 4*c* is a cross section of the diamond of FIG. 4*a* on a cutting plane containing vector P of FIG. 4*a* and perpendicular to the (011) plane shaded in FIG. 4*a*.

Referring now to FIG. 4*a*, there is shown along with cube 1 an octahedron 7, whose edges are chamfered and developed as dodecahedral surfaces. The visible dodecahedral surfaces are (011), (110), ($\bar{1}$10), ($\bar{1}$01), and (01$\bar{1}$). The octahedral vertices are partially chamfered, resulting in the development of cubic faces, the (001) and (010) faces being visible. The upper part of the cubic-dodecahedral octahedron 7 is the cubic-octahedral pyramid frustum 6.

Here, a dodecahedral surface of the diamond of FIG. 4*a* can be used as an octahedral-surface bordered tracing surface of a scanning blade. For example, the dodechedral surface (011), which has been shaded in FIG. 4*a* to make it prominent, may form a tracing surface. Note that the shading chosen for this surface in the diamond corresponds to the shading used in the cube for the equivalent surface. The (011) dodecahedral surface is bounded in pyramid frustum 6 by the octahedral surfaces (111) and ($\bar{1}$11). In scanning, the velocity of the scanning element relative to the information carrier can have, for example, the direction of vector P in FIG. 4*a*. If one makes a cross section with a cutting plane perpendicular to this vector P, the cross section of FIG. 4*b* is obtained.

Shown in FIG. 4*b* is the bearing force vector 8. The scanning plane, i.e. the macroscopic surface of the information carrier, extends perpnedicularly to the bearing force vector. The octahedral surfaces (111) and ($\bar{1}$11) have between them an angle of about 110°. The surface (011) bordered by the octahedral surfaces in FIG. 4*b* can be perpendicular to the bearing force vector 8 and thus contain the vector P of the relative velocity. However, the surface (011) can also be inclined slightly from the relative velocity vector P, thus corresponding to the variation discussed for the scanning blade of FIG. 3*d.*

In FIG. 4*a*, the proportional sizes of the dodecahedral, cubic, and octahedral surfaces are displayed with some license, in order to make the description clearer. Crystal forms of the type displayed in FIG. 4 do occur, but usually (for example, in the commercially usual cubo-octahedral, especially synthetic diamonds) the cubic surfaces are significantly larger and the dodecahedral surfaces are significantly narrower and also shorter, so that the cubic surfaces are eight-sided, with those of the eight sides bordering on octahedral surfaces beng significantly larger than those of the eight sides bordering dodecahedral surfaces. The octahedral surfaces are significantly smaller. With these things in mind, FIG. 4*c* is a cross section through the dodecahedral surface (011) and the cubic surfaces (010) and (001) bordering the (011) surface at either end in FIG. 4*a*. The cutting plane of FIG. 4*c* is perpendicular to the plane (011) and contains the direction P of FIG. 4*a*. The cubic surfaces enclose an angle of 90°, while each of them is inclined at an angle of 135° from the (011) surface.

The plane of the cross section of FIG. 4*c* contains the vector P of the relative velocity. Since, however, the (011) surface can either be inclined from the direction of the relative velocity or not, the angle of inclination for the present case being zero or the 10° of FIG. 3d for example, two directions are indicated in FIG. 4*c* for the relative velocity by the vectors P1 and P2. P1 is for the case where the (011) surface is inclined from the relative velocity P1 (corresponding to FIG. 3*d*), while P2 is for the case where there is zero inclination.

If the dodecahedral surface (011) in FIG. 4*a* is used as a part of a tracing surface of a scanning blade bordered by octahedral surfaces, then a plane of symmetry perpendicular to the approximate direction of the relative velocity is conceivable. This plane of symmetry would be valid, for instance, with respect to the angles at which the bordering cubic surfaces are inclined from the (011) surface. In using the ($\bar{1}$01) dodecahedral surface, this is not the case, because no cubic surface is present on the lower end in the example of FIG. 4*a*. Then, it is better for scanning if the edge lying at the intersection of the dodecahedral ($\bar{1}$01) and the cubic (001) surface forms the trailing edge of the scanning blade.

Naturally, the embodiment of FIG. 4*c* can be modified by providing a grinding of the surface between the octahedral surfaces, like in FIG. 3*c*.

In FIG. 4*c*, or in FIGS. 3*c* and 3*d*, the cubic or octahedral surface bordering at the trailing edge of the tracing surface may be ground away such that it takes on an orientation which is perpendicular to the tracing surface or perpendicular to the scanning plane. However, this has not proven necessary. It is very important that the trailing edge be sharp, but this sharpness is only required microscopically. That is, sharpness must be present right up at the edge; it must not be rounded there. But, the angle between the two surfaces forming the trailing edge is not so important, so long as it is not too obtuse.

The dimensions of the scanning blade tracing surface bordered by octahedral surfaces are in the order of magnitude of a few microns for scanners for the pressure scanning of video discs in high-density storage technology. The dimensions are determined by the groove width, since the tracing surface does have to protrude partly into the groove. Also determinative is the shortest wavelength of the signal-bearing relief. If one has a crystal in which the tracing surface is larger than needed, or else is not even present, the situation may be helped by some grinding, but the advantage of the invention, that at least one part of the crystal surfaces bounding the scanning blade is natural surface of a synthetic diamond or a diamond from the ground, must always be retained.

Since the angle between the flanks of the groove must be greater than the angles appearing in FIGS. 3*b* and 4*b*, the edges of the scanning blade which are approximately parallel too the direction of the relative velocity glide with their parts near to the trailing edge on the flanks of the groove. At least one of the flanks exhibits a signal-bearing surface relief. The corners formed by the trailing edge with the relative-velocity-parallel edges are the areas that wear off most strongly. In time, they become rounded. In the scanning blade of FIG. 2, the strongest loading consequently occurs in the direction of the edges between neighboring octahedral planes, i.e. in the dodecahedral planes and indeed approximately right in that direction in which the blade exhibits its greatest resistance to wear, which direction corresponds to the direction of the octahedral edges.

The situation is similar in the case of the scanning blade of FIG. 4*a*. In this case, however, and as mentioned above, the proportional size relationships between the cubic, dodecahedral, and octahedral surfaces must be chosen somewhat differently. Then, the greatest loading occurs on those corners where an edge between a dodecahedral surface and a cubic surface intersects with an edge between an octahedral surface and the cubic surface. The loading of the cubic surface is approximately in the direction of its greatest wear resistance.

The illustrated scanning blades are subjected to a finish grinding before they are put to use. In this grinding, the edges facing the information carrier and running approximately parallel to the relative velocity are rounded off.

It will be understood that the above description of the present invention is susceptible to various modifications, changes and adaptations, and the same are intended to be comprehended within the meaning and range of equivalents of the appended claims.

We claim:

1. In a device for scanning an information signal carrier having a groove defined by a groove surface, the device including a signal scanning means for scanning the information signals of said carrier, and a motive means for creating a relative velocity between said scanning means and said carrier along the groove during the scanning of information stored on said carrier, the improvement wherein:

the signal scanning means includes an element suited at least for guiding said signal scanning means in said groove, said element having a rounded tracng surface which faces toward the information carrier and contacts a portion of the groove surface during operation and comprising a diamond having a natural crystal face portion which bounds the tracing surface and which enables recognition of the crystallographic orientation of the element, said element being aligned crystallographically so that a wear resistant crystallographic direction of the element extends approximately parallel too the direction of said relative velocity.

2. In a device as claimed in claim 1, said element being further characterized by said tracing surface being bordered by at least one crystallographic octahedral surface.

3. In a device as claimed in claim 2, said element being further characterized by an appropriately parallel orientation of such an octahedral surface to the direction of the relative velocity.

4. In a device as claimed in claim 3, said element being further characterized in that such an octahedral surface is a natural crystal diamond face.

5. In a device as claimed in claim 3, said element being further characterized by a bordering of the tracing surface by two crystallographic octahedral surfaces extending approximately parallel to the direction of the relative velocity.

6. In a device as claimed in claim 5, said element being further characterized in that the two octahedral surfaces are natural crystal surfaces.

7. In a device as claimed in claim 3, said scanning element being further characterized by an orientation of the tracing surface essentially parallel to a crystallographic plane selected from the group consisting of the cubic and dodecahedral planes.

8. In a device as claimed in claim 7, said element being further characterized in that the tracing surface contains part of a natural crystal surface selected from the group consisting of cubic and dodecahedral surfaces, said diamond being selected from the group consisting of diamonds taken from the ground and synthetic diamonds.

9. In a device as claimed in claim 8, said element being further characterized in that said diamond is selected from the group consisting of diamond octahedrons and diamond pyramids, the triangular surfaces of such diamond forming crystallographic octahedral surfaces, the vertex of such diamond being chamfered and developed into a cubic surface, said tracing surface containing said developed cubic surface.

10. In a device as claimed in claim 9, said element being further characterized in that the tracing surface is bordered by four, natural, octahedral surfaces.

11. In a device as claimed in claim 8, said element being further characterized in that said diamond is selected from the group consisting of parts of diamond octahedrons, pyramids, cubo-octahedrons, and cubo-octahedral pyramid frustums whose side surfaces contain crystallographic octahedral surfaces and whose base surface is a crystallographic cubic surface, at least one of the edges between adjoining octahedral surfaces being chamfered and developed into a dodecahedral surface, said tracing surface containing the developed dodecahedral surface.

12. In a device as claimed in claim 11, said element being further characterized in that the tracing surface is bordered by two natural octahedral surfaces and two natural cubic surfaces.

13. In a device as claimed in claim 3, said element being further characterized in that the tracing surface is essentially symmetric about a symmetry plane determined by the direction of the relative velocity and the direction of a bearing force between the element and the surface of said groove.

14. In a device as claimed in claim 3, said element being further characterized in that the tracing surface is essentially symmetric about a symmetry plane determined by being perpendicular to the edge formed by the intersection of the tracing surface with the parallelly oriented octahedral surface, the parallelly oriented octahedral surface being a natural crystal face.

15. In a device as claim in claim 14, said element being further characterized by a symmetry about said symmetry plane with respect to the angles formed by the tracing surface with surfaces bordering the tracing surface at the tracing surface end in the direction of the relative velocity and at the tracing surface end in the direction counter to the direction of the relative velocity.

16. In a device as claimed in claim 2, said element being further characterized by an inclining of the tracing surface from the direction of the relative velocity, the inclining being up to 20°.

17. In a device as claimed in claim 2, said element being further characterized by an orientation of the diamond wherein one of its crystallographic cubic planes is inclined from the direction of the relative velocity, the angle of inclination being up to 20°.

18. In a device as claimed in claim 17, said element being further characterized by an orientation of said one cubic plane within the angular range extending between the tracing surface and the direction of the relative velocity.

19. In a device as claimed in claim 2, said element being further characterized by an orientation of the diamond wherein one of its crystallographic dodecahedral planes is inclined from the direction of the relative velocity, the angle of the inclination being up to 20°.

20. In a device as claimed in claim 19, said element being further characterized by an orientation of said one dodecahedral plane within the angular range extending between the tracing surface and the direction of the relative velocity.

21. In a device as claimed in claim 1, said element being further characterized by having a trailing edge formed by the intersection of a natural crystal surface with the tracing surface.

22. A method for crystallographically aligning a diamond scanning element of a signal scanner, said element being guided in a groove having a longitudinal direction, said element having a tracing surface which contacts a portion of said groove and having surfaces with planar portions which bound said element comprising:

1. providing a diamond crystal having (a) an edge which extends in a wear resistant direction of said crystal, and which is rounded off for guidance in the groove, and (b) a natural crystal surface bounding said tracing surface said natural crystal surface indicating the crystallographic alignment of the diamond; and
2. using said natural crystal surface to crystallographically align the crystal on the signal scanner so that the wear resistant direction extends approximately parallel to the longitudinal direction of the groove.

23. A method for crystallographically aligning a diamond scanning element of a signal scanner, said scanning element being guided in a groove having a longitudinal direction, said element having a tracing surface which contacts a portion of said groove and having surfaces with planar portions which bound said element comprising:

1. providing a diamond crystal having (a) a corner which is rounded off for guidance in the groove and (b) a natural crystal surface bounding said tracing surface, said natural crystal surface indicating the crystallographic alignment of the diamond; and
2. using said natural crystal surface to crystallographically align the diamond on the signal scanner so that a wear resistant crystallographic direction of the element extends approximately parallel to the longitudinal direction of the groove.

24. A method for crystallographically aligning a diamond scanning element of a signal scanner, said element being guided in a groove of an information carrier having a scanning plane, said groove having a longitudinal direction and said element being relatively movable in said direction, said element having a tracing surface which contacts a portion of the groove and having surfaces with planar portions which bound said element comprising:

1. providing a diamond crystal (a) in which said tracing surface is rounded for guidance in the groove and (b) having a natural crystal surface bounding said element, said natural crystal surface indicating the crystallographic alignment of the diamond; and
2. using said natural crystal surface to crystallographically align the diamond in the signal scanner so that a wear resistant crystallographic direction extends approximately parallel to the longitudinal direction of the groove.

25. The method as defined in claim 24 wherein a natural octahedron surface is used to effect the alignment.

26. The method as defined in claim 25 wherein the scanning element is skid-shaped and a natural octahedron surface extending parallel to the longitudinal direction of the skid is used to align the skid-shaped scanning element.

27. The method as defined in claim 26 wherein during the alignment of the scanning element, its tracing surface is limited by two crystallographic octahedron surfaces which are aligned approximately parallel to the direction of movement of the scanning element relative to the groove.

28. The method as defined in claim 27 wherein the said crystallographic octahedron surfaces are natural crystal surfaces.

29. The method as defined in claim 25 wherein the tracing surface of the scanning element facing the groove is aligned to be parallel to a crystallographic plane selected from the group of cubic and dodecahedron planes.

30. The method as defined in claim 25 wherein a symmetrical scanning element is used which is so aligned that it lies symmetrical to a plane of symmetry which is defined by the longitudinal direction of the groove and the direction perpendicular to the scanning plane of the information carrier.

31. The method as defined in claim 25 wherein a symmetrical scanning element is used which is so aligned that it lies symmetrical to a plane of symmetry which extends perpendicular to the longitudinal direction of the tracing surface of the scanning element, that is, perpendicular to the line of intersection of the tracing surface with the approximately natural octahedron surface which extends approximately parallel to the direction of movement of the scanning element relative to the groove.

32. The method as defined in claim 25 wherein the diamond is selected from the group consisting of diamond pyramids and octahedrons, and at least part of the diamond whose triangular surfaces form crystallographic octahedron surfaces are rounded at the tips in such a way that the rounded portion forms the tracing surface and contains a crystallographic cube surface.

33. The method as defined in claim 25 wherein the diamond is selected from the group consisting of diamond octahedrons, pyramids, cubo-octahedrons and cubo-octahedron frustopyramids, and at least a portion of the diamond whose side surfaces contain crystallographic octahedron surfaces and whose base is a crystallographic cube surface is rounded in such a manner that the rounded portion forms the tracing surface and contains a crystallographic dodecahedron surface.

34. The method as defined in claim 25 wherein a scanning element is used whose tracing surface is limited by two natural octahedron surfaces and two natural cube surfaces.

35. The method as defined in claim 25 wherein a scanning element is used which is limited against its direction of movement relative to the groove by a natural crystal surface.

36. The method as defined in claim 25 wherein a symmetrical scanning element is used, which is so aligned that it lies symmetrical to a plane of symmetry, said natural octahedron surface extends approximately parallel to the direction of movement of the element relative to the groove, said tracing surface has an edge which intersects said natural octahedron surface and extends essentially parallel to the longitudinal direction of the groove, and said plane of symmetry is perpendicular to said edge.

37. The method as defined in claim 24 wherein the scanning element is skid-shaped and a natural octahedron surface which borders the skid in the longitudinal direction is used to align the skid-shaped scanning element.

38. The method as defined in claim 37 wherein the tracing surface is rounded in such a way that it contains parts of a natural crystal surface which is selected from the group of cubic and dodecahedron surfaces.

39. The method as defined in claim 37 wherein a scanning element is used whose tracing surface is limited by four natural octahedron surfaces.

40. The method as defined in claim 24 wherein the tracing surface of the scanning element is aligned in such a manner that it is inclined at an angle of up to 20° with respect to the direction of movement of the scanning element relative to the groove.

41. The method as defined in claim 24 wherein a crystallographic cube surface of the diamond is aligned at an angle of up to 20° with respect to the direction of movement of the scanning element relative to the groove.

42. The method as defined in claim 41 wherein the crystallographic cube surface is aligned in the angular range between the tracing surface of the scanning element facing the groove and the direction of movement.

43. The method as defined in claim 24 wherein the crystallographic dodecahedron surface of the diamond is aligned at an angle of up to 20° with respect to the direction of movement of the scanning element relative to the groove.

44. The method as defined in claim 43 wherein the crystallographic dodecahedron surface is aligned in the angular range between the tracing surface of the scanning element facing the groove and the direction of movement.

* * * * *

UNITED STATES PATENT OFFICE
CERTIFICATE OF CORRECTION

PATENT NO. : 3,877,705

DATED : April 15th, 1975

INVENTOR(S) : Günter Joschko et al

It is certified that error appears in the above-identified patent and that said Letters Patent are hereby corrected as shown below:

In the heading of the patent, under [73] Assignee, correct the assignee's name and address to read: --TED Bildplatten Aktiengesellschaft AEG-TELEFUNKEN · TELDEC, Zug, Switzerland--

Column 1, line 54, change "whiich" to --which--.

Column 3, line 13, change "P 21 49 439.31" to --P 21 49 439.3-- and delete bold-face printing; line 49, change "mong" to --mond--.

Column 4, line 27, before "practice" insert --in--; line 45, change "crystallgraphic" to --crystallographic--; line 63, change "onthe" to --on the--.

Column 6, line 1, change "cointact" to --contact--; line 7, change "abovementioned" to --above-mentioned--.

Column 9, line 36, change "(III) ($\bar{I}$II) ($\bar{I}\bar{I}$I) (I$\bar{I}$I)" to --(111) ($\bar{1}$11) ($\bar{1}\bar{1}$1) (1$\bar{1}$1)--; lines 45-46, change "oppositelylying" to --oppositely-lying--.

Column 10, line 10, change "($\bar{1}\bar{1}$0)" to --[$\bar{1}\bar{1}$0]--; line 12, change "($\bar{1}$10)" to --[$\bar{1}$10]--; line 47, change "($\bar{1}$10)" to --[$\bar{1}$10]--; line 68, change "withiin" to --within--.

Column 11, line 31, change "perpnedicularly" to --perpendicularly--; line 51, change "beng" to --being--.

Column 12, line 52, change "too" to --to--.

Column 13, line 30, change "tracng" to --tracing--; line 46, change "appropriately" to --approximately--.

Column 15, line 61, change "element" to --tracing surface--.

Column 16, line 19, after "group" insert --consisting--; line 28, delete "scanning"; line 30, after "extends" insert --approximately--; lines 31-36, delete "tracing surface.........relative to the".

Column 17, line 14, after "group" insert --consisting--.

Signed and Sealed this

*seventh* Day of *October 1975*

[SEAL]

*Attest:*

RUTH C. MASON
*Attesting Officer*

C. MARSHALL DANN
*Commissioner of Patents and Trademarks*